No. 767,564. PATENTED AUG. 16, 1904.
G. JOHNSON, Jr.
CUTTER FOR WOOD PLANING MACHINES.
APPLICATION FILED NOV. 29, 1901.
NO MODEL.
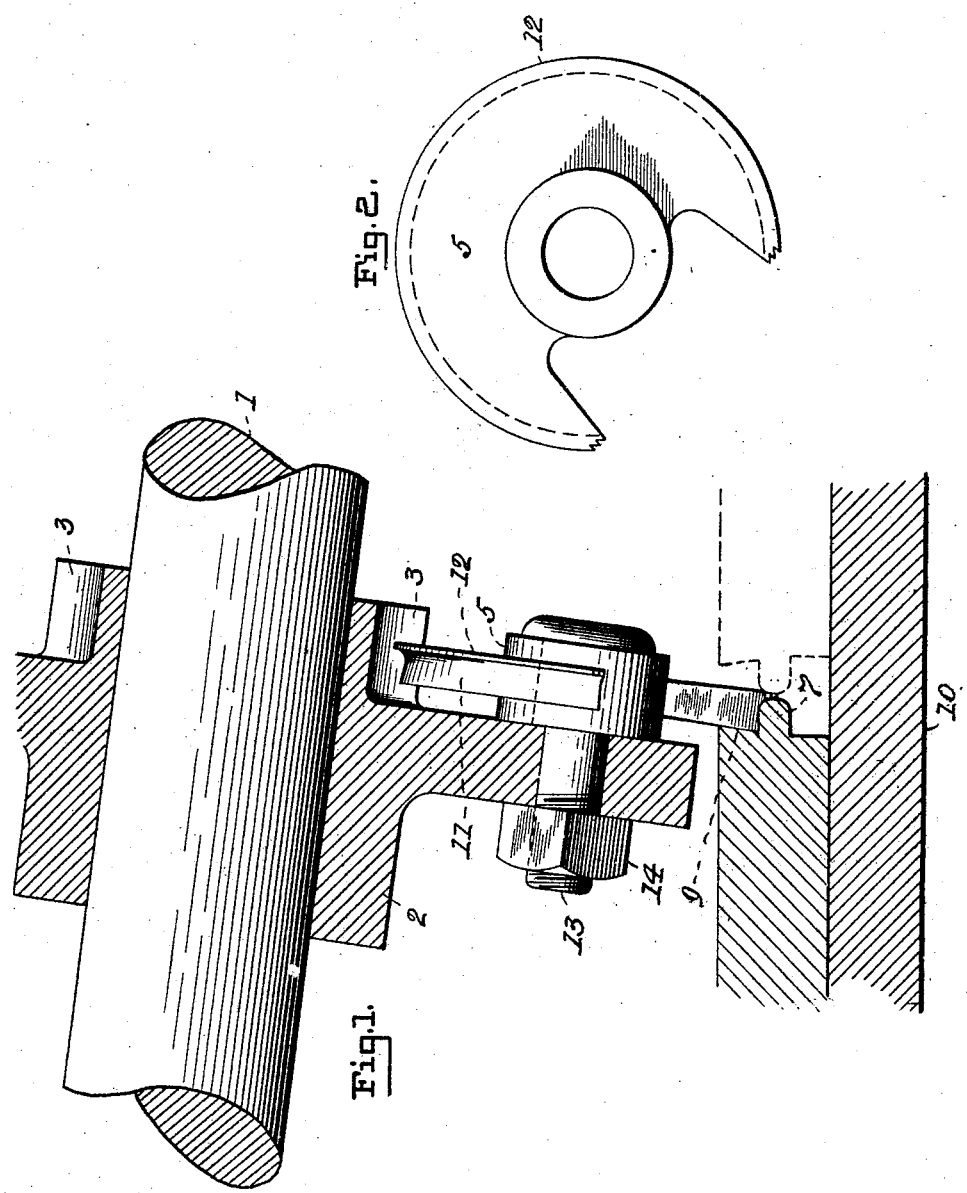
WITNESSES:
A. O. Babcock
Estep J. Goth
INVENTOR:
Greenleaf Johnson, Jr.
by Howard
atty.

No. 767,564. Patented August 16, 1904.

UNITED STATES PATENT OFFICE.

GREENLEAF JOHNSON, JR., OF BALTIMORE, MARYLAND.

CUTTER FOR WOOD-PLANING MACHINES.

SPECIFICATION forming part of Letters Patent No. 767,564, dated August 16, 1904.

Application filed November 29, 1901. Serial No. 84,043. (No model.)

*To all whom it may concern:*

Be it known that I, GREENLEAF JOHNSON, Jr., of the city of Baltimore and State of Maryland, have invented certain Improvements in Cutters for Wood-Planing Machines, of which the following is a specification.

This invention relates to an improved cutter for producing in a flooring-board the upper half of a tongue and the undercut surface which is above it, as will hereinafter fully appear.

In the further description of the said invention which follows reference is made to the accompanying drawings, forming a part hereof, and in which—

Figure 1 is an exterior edge view of the improved cutter, together with a cross-sectional view of a part of its head and the shaft carrying the same. It also shows two boards and the bed of a planing-machine upon which the said boards rest. Fig. 2 is an exterior side view of the said cutter.

Referring now to the drawings, 1 is a shaft adapted to rotate in an inclined position, as shown, and 2 a portion of the cutter-head, which is of well-known construction. In the face of the head 2 is a series of recesses 3, generally four in number, for the reception of circular or disk cutters, the general form of which is common in cutters for producing tongues on the edges of boards.

5 represents one of the improved cutters, and by reference to Fig. 1 it will be seen that its cutting edge follows the contour of the upper half of the tongue 7, and by its being set on a suitable angle the undercut surface 9 is produced. In order that the flat surface of the tongue may be on a horizontal line, or parallel with the surface of the bed 10 of the machine, it is necessary that the portion 11 of the cutter extending from the flange part 12, which not only rounds the edge of the tongue, but also severs it from a similar tongue on another and adjoining board, (shown in dotted lines only,) should flare, the degree of flare being dependent upon the angle of the shaft. The diameter of the part 11 of the cutter therefore increases as it leaves the flange portion, thus giving to it a frusto-conical form.

13 is the bolt which, with the nut 14, secures the cutter 5 to its head.

The cutting edge of the flange portion 12 of the cutter is formed in steps, as shown particularly in Fig. 2, in order that the separation of the two adjoining tongues may be gradual; but this feature is not new and forms no part of the present invention, which only aims to cut the upper surface of the tongue and an undercut surface adjoining it, as before stated.

It will be understood that the tongue and undercut surface of the adjoining board is produced by a similar cutter on a separate head and shaft, which are set on a reverse angle and the cutter reversed in position, and that the under surface of the tongues and the vertical surface adjoining it are produced by cutters well known in the art.

The cutter is shown as having two cutting edges (see Fig. 2) in order that it may be driven in either direction of rotation.

I claim as my invention—

In combination with the horizontal bed of a wood-planing machine, a shaft arranged to rotate in an inclined position with reference to the said bed, a cutter-head secured to said shaft, a bolt extending through the said head with its axis parallel with that of the shaft, a disk cutter held to the said head by means of the bolt, the said cutter having a flange member which forms its outer surface, a frusto-conical member with its smaller diameter adjoining the flange member, the angularity of the frusto-conical member of the cutter being double that of the angle produced by a line passing through the axis of the shaft and the upper surface of the horizontal bed, whereby the lower limb of the frusto-conical member of the cutter will be parallel with the horizontal bed, substantially as, and for the purpose specified.

GREENLEAF JOHNSON, JR.

Witnesses:
OREGON MILTON DENNIS,
ESTEP T. GOTT.